United States Patent
Marcus et al.

(10) Patent No.: US 7,667,692 B2
(45) Date of Patent: *Feb. 23, 2010

(54) HUMAN INTERFACE SYSTEM

(75) Inventors: Beth Marcus, Bedford, MA (US); W. David Lee, Newton, MA (US)

(73) Assignee: Zeemote, Inc., Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,411

(22) Filed: Dec. 5, 2008

(65) Prior Publication Data

US 2009/0143142 A1    Jun. 4, 2009

Related U.S. Application Data

(63) Continuation of application No. 11/747,863, filed on May 11, 2007, now Pat. No. 7,463,245, which is a continuation of application No. 10/699,555, filed on Oct. 31, 2003, now Pat. No. 7,218,313.

(51) Int. Cl.
*G09G 5/00* (2006.01)

(52) U.S. Cl. .................................. 345/169; 345/168

(58) Field of Classification Search ................ 345/156, 345/168, 169, 173; 400/472; 341/22
See application file for complete search history.

(56) References Cited

U.S. PATENT DOCUMENTS

| | | | |
|---|---|---|---|
| 4,793,312 A | 12/1988 | Doinaga et al. | |
| 4,867,028 A | 9/1989 | Jones | |
| 4,891,777 A | 1/1990 | Lapeyre | |
| 4,896,554 A | 1/1990 | Culver | |
| 4,912,462 A | 3/1990 | Washizuka et al. | |
| 5,189,416 A | 2/1993 | Estes | |

(Continued)

FOREIGN PATENT DOCUMENTS

DE    298 23 417 U1    5/1999

(Continued)

OTHER PUBLICATIONS

State Intellectual Property Office of PRC Notification of First Office Action dated Nov. 21, 2008, Chinese Patent Appln No. 200710153371.3.

(Continued)

*Primary Examiner*—Ricardo L Osorio
(74) *Attorney, Agent, or Firm*—Fish & Richardson P.C.

(57) ABSTRACT

A human interface configured to optimize a biomechanical effect of a human user's opposing thumb and fingers by including, on one surface, one or more software configurable input elements manipulatable by a user's thumb(s) or a stylus, and, on another surface, one or more software configurable selection elements manipulatable by a user's finger(s). A selection element may be a pressure sensor pad configurable to represent delineated active areas that are mapped to one or more input functions. Shape changing media may be provided to permit a user to tactilely discriminate between delineated active areas. Tactile feedback may be provided to a user through palpable detents, vibratory or force producing units. Inputting data may include mapping each selection element to a shift function, mapping each input element to text functions, and using the selection elements to shift between text functions associated with an input element to input a desired text function.

20 Claims, 9 Drawing Sheets

U.S. PATENT DOCUMENTS

| | | | |
|---|---|---|---|
| 5,365,589 | A | 11/1994 | Gutowitz |
| 5,432,510 | A | 7/1995 | Matthews |
| 5,473,325 | A | 12/1995 | McAlindon |
| 5,512,919 | A | 4/1996 | Araki |
| 5,515,305 | A | 5/1996 | Register et al. |
| 5,612,690 | A | 3/1997 | Levy |
| 5,782,642 | A | 7/1998 | Goren |
| 5,824,931 | A | 10/1998 | Papadopoulos |
| 5,859,629 | A | 1/1999 | Tognazzini |
| 5,900,864 | A | 5/1999 | Macdonald |
| 5,973,621 | A | 10/1999 | Levy |
| 6,005,496 | A | 12/1999 | Hargreaves et al. |
| 6,084,576 | A | 7/2000 | Leu et al. |
| 6,107,988 | A | 8/2000 | Phillipps |
| 6,115,028 | A | 9/2000 | Balakrishnan et al. |
| 6,184,804 | B1 | 2/2001 | Harrison |
| 6,219,731 | B1 | 4/2001 | Gutowitz |
| 6,228,709 | B1 | 5/2001 | Hsieh |
| 6,232,956 | B1 | 5/2001 | Mailman |
| 6,297,752 | B1 | 10/2001 | Ni |
| 6,377,685 | B1 | 4/2002 | Krishnan |
| RE37,723 | E | 6/2002 | Goren |
| 6,512,511 | B2 | 1/2003 | Willner et al. |
| 6,520,699 | B2 | 2/2003 | Abe |
| 6,541,715 | B2 | 4/2003 | Swanson |
| 6,542,091 | B1 | 4/2003 | Rasanen |
| 6,546,239 | B1 | 4/2003 | Pazdersky et al. |
| 6,573,844 | B1 | 6/2003 | Venolia et al. |
| 6,606,486 | B1 | 8/2003 | Cubbage et al. |
| 6,654,733 | B1 | 11/2003 | Goodman et al. |
| 6,703,963 | B2 | 3/2004 | Higginson |
| 6,738,045 | B2 | 5/2004 | Hinkley et al. |
| 6,741,235 | B1 | 5/2004 | Goren |
| 6,760,013 | B2 | 7/2004 | Willner et al. |
| 6,865,718 | B2 | 3/2005 | Montalcini |
| 6,885,317 | B1 | 4/2005 | Gutowitz |
| 6,885,318 | B2 | 4/2005 | Bickerton |
| 6,909,424 | B2 | 6/2005 | Liebenow et al. |
| 6,911,608 | B2 | 6/2005 | Levy |
| 6,947,028 | B2 | 9/2005 | Shkolnikov |
| 6,980,200 | B2 | 12/2005 | Goren |
| 7,072,975 | B2 | 7/2006 | Kato |
| 7,092,734 | B2 | 8/2006 | Herle et al. |
| 2002/0019259 | A1 | 2/2002 | Armstrong |
| 2002/0023265 | A1 | 2/2002 | Mercalf |
| 2002/0163504 | A1 | 11/2002 | Pallakoff |
| 2003/0020692 | A1 | 1/2003 | Griffin et al. |
| 2003/0048205 | A1 | 3/2003 | He |
| 2003/0061103 | A1 | 3/2003 | Kanai |
| 2003/0083114 | A1 | 5/2003 | Lavin et al. |
| 2003/0095156 | A1 | 5/2003 | Klein et al. |
| 2003/0122784 | A1 | 7/2003 | Shkolnikov |
| 2003/0169188 | A1 | 9/2003 | Chang et al. |
| 2003/0193418 | A1 | 10/2003 | Shi |
| 2004/0107303 | A1 | 6/2004 | Mulligan |
| 2004/0208681 | A1 | 10/2004 | Dechene |
| 2005/0093846 | A1 | 5/2005 | Marcus et al. |

FOREIGN PATENT DOCUMENTS

| | | |
|---|---|---|
| DE | 2002 27645 A1 | 4/2002 |
| EP | 0251477 | 1/1988 |
| EP | 0585730 | 3/1994 |
| EP | 1103883 | 5/2001 |
| EP | 1293882 | 3/2003 |
| EP | 1 376 319 A1 | 1/2004 |
| JP | 2000-267787 A | 9/2000 |
| KR | 1999-0072889 | 9/1999 |
| WO | 91/05303 | 4/1991 |
| WO | WO 03/007117 A2 | 1/2003 |
| WO | 03/042805 | 5/2003 |
| WO | WO 03/052948 A1 | 6/2003 |
| WO | WO 2004/019315 A1 | 3/2004 |

OTHER PUBLICATIONS

"Introducing the Dvorak Keyboard", http://www.mwbrooks.com/dvorak/.

Alphagrip, http://www.alphagrips.com/AlphagripAG5UsersManual.pdf.

Amy K. Karlson, Benjamin B. Bederson, John SanGiovanni, 2004. AppLens and LaunchTile: Two Designs for One-Handed Thumb Use on Small Devices, http://hcil.cs.umd.edu/trs/2004-37/2004-37.html.

Andriy Pavlovych, Wolfgang Stürzlinger: Less-Tap: A Fast and Easy-to-learn Text Input Technique for Phones. Graphics Interface 2003, 97-104, http://www.graphicsinterface.org/cgi-bin/DownloadPaper?name=2003/170/paper170.pdf.

Atrua: sensor company, http://www.atrua.com/s-mobilephones.html.

Baillie, L., Kunczier, H., and Anegg, H. 2005. Rolling, rotating and imagining in a virtual mobile world. In Proceedings of the 7th international Conference on Human Computer interaction with Mobile Devices &Amp; Services (Salzburg, Austria, Sep. 19-22, 2005). MobileHCI '05, vol. 111. ACM Press, New York, NY, 283-286. http://doi.acm.org/10.1145/1085777.1085833.

Bartlett, J. F. 2000. Rock 'n' Scroll Is Here to Stay. IEEE Comput. Graph. Appl. 20, 3 (May 2000), 40-45. http://portal.acm.org/citation.cfm?id=618728&coll=Portal&dl=GUIDE&CFID=66588306&CFTOKEN=73460863#.

Bluetooth GPS, http://mobilitytoday.com/news/005986/mobility_buyGPSnow_i-Blue_bluetooth_GPS.

Buxton, "A Directory of Sources for Input Technologies", Oct. 1, 2003, http://www.billbuxton.com/InputSources.html.

Buxton, "An Introduction to Human Input to Computers", Apr. 6, 1999, http://www.billbuxton.com/input01.Introduction.pdf.

Buxton, "Human Input to Computer Systems: Theories, Techniques and Technology", http://billbuxton.com/inputManuscript.htlm.

C. Metzger, M. Anderson, T. Starner, 2004. FreeDigiter: A Contact-Free Device for Gesture Control. Eighth IEEE International Symposium on Wearable Computers (ISWC'04) pp. 18-21. http://www.wirelessrerc.gatech.edu/projects/development/D1files/iswc04-freedigiter.pdf.

Chipman, L. E., Bederson, B. B., and Golbeck, J. A. 2004. SlideBar: analysis of a linear input device. Behav. Inf. Tech. 23, 1 (Jan. 2004), 1-9. http://portal.acm.org/citation.cfm?id=993182.993184#, http://www.cs.umd.edu/Library/TRs/CS-TR-4471/CS-TR-4471.pdf.

Chording and Tilting—Daniel Wigdor (thesis)—2004- describes chordtap and tilttap (also covered in depth in the paper referenced below), http://www.dgp.toronto.edu/~dwigdor/research/thesis/submitted.html.

Daniel Fällmana, Andreas Lund, Mikael Wiberg, ScrollPad: Tangible Scrolling with Mobile Devices, Proceedings of the Proceedings of the 37th Annual Hawaii International Conference on System Sciences (HICSS'04)—Track 9, p. 90286.3, Jan. 5-8, 2004. http://portal.acm.org/citation.cfm?id=963347&coll=GUIDE&dl=GUIDE&CFID=66483658&CFTOKEN=36023921, http://daniel.fallman.org/resources/papers/fallman-hicss37.pdf.

Daniel Wigdor, Ravin Balakrishnan, TiltText: using tilt for text input to mobile phones, Proceedings of the 16th annual ACM symposium on User interface software and technology, p. 81-90, Nov. 2-5, 2003, Vancouver, Canada, http://portal.acm.org/citation.cfm?id=964705, http://www.dgp.toronto.edu/~ravin/papers/uist2003_tilttext.pdf.

DigitWireless: FastTap, http://www.digitwireless.com/flash/download/fastap.pdf.

Donner, J. (2005). Research Approaches to Mobile Use in Developing World: A Review of the Literature. International Conference on Mobile Communication and Asian Modernities City University of Hong Kong, Jun. 7-8, 2005.

Eleksen, www.eleksen.com.

Eslambolchilar, P., Murray-Smith, R. (2004). Tilt-Based Automatic Zooming and Scaling in Mobile Devices—A state-space implementation. In Proc. of Mobile Human-Computer Interaction (MobileHCI 2004), Glasgow, UK, Sep. 2004: In S. Brewster and M. Dunlop (Eds.). Mobile Human-Computer-Interaction—MobileHCI 2004, Lecture Notes in Computer Science, vol. 3160, Berlin: Springer, 120-131.

JPO Notification of Reason(s) for Refusal; Dispatch Date: Jul. 8, 2008; Dispatch No. 396667.

Exideas, http://www.exideas.com/ME/index.html, http://www.exideas.com/ME/HardKey.html.

GamePad, http://www.mobilemag.com/content/100/345/C5578/.

Goldstein, M., et al., "The Finger-Joint-Gesture Wearable Keypad," Ericsson Radio Systems AB., pp. 9-18.

Green, N., Kruger, J., Faldu, C., and St. Amant, R. 2004. A reduced QWERTY keyboard for mobile text entry. In CHI '04 Extended Abstracts on Human Factors in Computing Systems (Vienna, Austria, Apr. 24-29, 2004). CHI '04. ACM Press, New York, NY, 1429-1432. http://portal.acm.org/citation.cfm?id=986082&coll=GUIDE&dl=GUIDE&CFID=66591340&CFTOKEN=6294934.

H. Kober, E. Skepner, T. Jones, H. Gutowitz, S. MacKenzie, 2001. Linguistically Optimized Text Entry on a Cell Phone. In Proceedings of the CHI 2001. http://www.eatoni.com/research/chi.pdf.

Harrison, B. L., Fishkin, K. P., Gujar, A., Mochon, C., and Want, R. 1998. Squeeze me, hold me, tilt me! An exploration of manipulative user interfaces. In Proceedings of the SIGCHI Conference on Human Factors in Computing Systems (Los Angeles, California, United States, Apr. 18-23, 1998). C. Karat, A. Lund, J. Coutaz, and J. Karat, Eds. Conference on Human Factors in Computing Systems. ACM Press/Addison-Wesley Publishing Co., New York, NY, 17-24. http://portal.acm.org/citation.cfm?id=274647&coll=Portal&dl=GUIDE&CFID=66588306&CFTOKEN=73460863&CFID=66588306&CFTOKEN=73460863#.

Hinckley, K., Cutrell, E., Bathiche, S., and Muss, T. 2002. Quantitative analysis of scrolling techniques. In Proceedings of the SIGCHI Conference on Human Factors in Computing Systems: Changing Our World, Changing Ourselves (Minneapolis, Minnesota, USA, Apr. 20-25, 2002). CHI '02. ACM Press, New York, NY, 65-72. http://doi.acm.org/10.1145/503376.503389.

Hinckley, K., Pierce, J., Horvitz, E., Sinclair, M. Foreground and Background Interaction with Sensor-enhanced Mobile Devices, ACM TOCHI (Transactions on Computer-Human Interaction) Special Issue on Sensor-Based Interaction, 12 (1), Mar. 2005, pp. 31-52. http://portal.acm.org/citation.cfm?id=1057240&coll=GUIDE&dl=GUIDE&CFID=66591340&CFTOKEN=6294934.

Hinkley, K., Pierce, J., Sinclair, M., and Horvitz, E. Sensing Techniques for Mobile Interaction. UIST 2000: ACM Symposium on User Interface Software and Technology, pp. 91-100. http://portal.acm.org/citation.cfm?id=354417&coll=GUIDE&dl=GUIDE&CFID=66483658&CFTOKEN=36023921.

Howard.co.kr—The mouse phone, http://www.howard.co.kr/computer/mouse/mousephone.htm.

Innovative Ergonomic Solutions, Cirque Pocket Keyboard, http://www.iesproducts.com/key-misc-pocket.html.

Introducing the Dvorak Keyboard, http://www.mwbrooks.com/dvorak/.

Jeong-Hoon Shin and Kwang-Seok Hong. An improved alphanumeric input algorithm using gloves. http://www.complexity.org.au/conference/upload/shin01/shin01.pdf.

K. Lyons, T. Starner, D. Plaisted, J. Fusia, A. Lyons, A. Drew, E. W. Looney, 2004. "Twiddler Typing: One-Handed Chording Text Entry for Mobile Phones," Proc. Conf. Human Factors in Computing Systems (SIGCHI 01), ACM Press, 2004, pp. 671-678. http://www.cc.gatech.edu/fac/Thad.Starner/p/030_10_MTE/twiddler-chi04.pdf.

K. Lyons. Everyday wearable computer use: A case study of an expert user. In Proceedings of Mobile HCI 2003, pp. 61-75, 2003. http://www.cc.gatech.edu/ccg/publications/everyday_case.pdf.

Kiyokuni Kawachiya, Hiroshi Ishikawa, NaviPoint: an input device for mobile information browsing, Proceedings of the SIGCHI conference on Human factors in computing systems, p. 1-8, Apr. 18-23, 1998, Los Angeles, California, United States http://portal.acm.org/citation.cfm?id=274645&coll=Portal&dl=GUIDE&CFID=66588306&CFTOKEN=73460863.

Kjeldskov, J. and Graham, C. (2003). A Review of Mobile HCI Research Methods. In Proc. of Mobile Human-Computer Interaction (MobileHCI 2003), Udine Italy, Sep. 2003: In L. Chittaro (Ed.). Mobile Human-Computer-Interaction—MobileHCI 2003, Lecture Notes in Computer Science, vol. 2795, Berlin: Springer, 317-335.

Kjeldskov, J. Stage, J. (2004). New Techniques for Usability Evaluation of Mobile Systems. International Journal of Human-Computer Studies, May 2004, 60 (5-6): 599-620.

Kranz, M., Holleis, P., Schmidt, A. "DistScroll—a new one-handed interaction device". In Proceedings of the 5th International Workshop on Smart Appliances and Wearable Computing, Jun. 10, 2005. http://www.hcilab.org/documents/DistScrol-1AnewOneHandedInteractionDevice-KranzHolleisSchmidt-IWSAWC2005.pdf.

Kyocera Candid KX16, http://www.mobilemag.com/content/100/340/C4392/.

Lee Butts, Andy Cockburn, An evaluation of mobile phone text input methods, Third Australasian conference on User interfaces, p. 55-59, Jan. 1, 2002, Melbourne, Victoria, Australia, http://www.crpit.com/confpapers/CRPITV7Butts.pdf.

Lee, S. and Hong S.H.. Chording as a Text Entry Method in Mobile Phones. In Proceedings of the MobileHCI 2004: 6th International Symposium, Glasgow, UK, Sep. 13-16, 2004.

Lee, S., Hong, S. H., and Jeon, J. W. 2002. Designing a universal keyboard using chording gloves. SIGCAPH Comput. Phys. Handicap., 73-74 (Jun. 2002), 142-147. http://doi.acm.org/10.1145/960201.957230.

Lumsden, J., Gammell, A. (2004). Mobile Note Taking: Investigating the Efficacy of Mobile Text Entry. In Proc. of Mobile Human-Computer Interaction (MobileHCI 2004), Glasgow, UK, Sep. 2004: In S. Brewster and M. Dunlop (Eds.). Mobile Human-Computer-Interaction—MobileHCI 2004, Lecture Notes in Computer Science, vol. 3160, Berlin: Springer, 156-168.

M. D. Dunlop and A. Crossan, "Dictionary based text entry method for mobile phones", published in Brewster, S.A., and Dunlop, M.D., (editors). Proceedings of Second Workshop on Human Computer Interaction with Mobile Devices, Aug. 1999. http://www.cis.strath.ac.uk/~mdd/research/publications/99dunloperossan.pdf.

M. Kolsch, M. Turk, 2002. Keyboards without Keyboards: A Survey of Virtual Keyboards. UCSB Technical Report 2002-21, Jul. 12, 2002. http://www.cs.ucsb.edu/research/tech_reports/reports/2002-21.pdf.

MacKay, B., Dearman, D., Inkpen, K., and Watters, C. 2005. Walk 'n scroll: a comparison of software-based navigation techniques for different levels of mobility. In Proceedings of the 7th international Conference on Human Computer interaction with Mobile Devices &Amp; Services (Salzburg, Austria, Sep. 19-22, 2005). MobileHCI '05, vol. 111. ACM Press, New York, NY, 183-190. http://portal.acm.org/citation.cfm?id=1085808&coll=GUIDE&dl=GUIDE&CFID=66591340&CFTOKEN=6294934.

MacKenzie, I. S. (2002). KSPC (keystrokes per character) as a characteristic of text entry techniques. Proceedings of the Fourth International Symposium on Human-Computer Interaction with Mobile Devices, pp. 195-210. Heidelberg, Germany: Springer-Verlag.

MacKenzie, I. S., & Soukoreff, R. W. Phrase sets for evaluating text entry techniques. Extended Abstracts of the ACM Conference on Human Factors in Computing Systems—CHI 2003, pp. 754-755 New York: ACM.

MacKenzie, S., & Soukoreff, W. (2002). Text entry for mobile computing: Models and methods, theory and practice. Human-Computer Interaction. 17. p. 147-198. http://www.yorku.ca/mack/hci3-2002.pdf.

Microth KeyWheel, http://www.microth.com/circumscript/overview.asp.

Mikael Goldstein, Didier Chincholle, Morten Back (2000). Assessing Two New Wearable Input Paradigms: The Finger-Joint-Gesture Palm-Keypad Glove and the Invisible Phone Clock. Personal and Ubiquitous Computing, vol. 4, Issue 2/3.

Mikael Goldstein and Didier Chincholle The Finger-Joint-Gesture Wearable Keypad. Ericsson Radio Systems.

Min, Lin and Sears, Andrew (2005). Graphics Matter: A Case Study of Mobile Phone Keypad Design for Chinese Input. CHI 2005, Late Breaking Results: Posters, Portland, Oregon. Apr. 2-7, 2005.

Motorola—iTAP, http://news.zdnet.co.uk/hardware/mobile/0,39020360,39118435,00.htm.

NE-Ware, http://www.n-e-ware.com/Downloads/KeyStick/330/KSUserManual330_01.pdf.

Nokia 6620 with a control stick, http://nds2.nokia.com/files/support/nam/phones/guides/6620_US_en.PDF.

Oniszczak, A., & MacKenzie, I. S. (2004). A comparison of two input methods for keypads on mobile devices. Proceedings of NordiCHI 2004, pp. 101-104. New York: ACM. http://www.yorku.ca/mack/nordichi2004.pdf.

Orientation-based interaction for Mobile Devices. J. Darnauer, S. Garrity and T. Jim, Stanford University, pp. 1-4, found on the internet at http://hci.stanford.edu/srk/cs377a-mobile/project/final/darnauer-garrity-kim.pdf.

Partridge, K., Chatterjee, S., Sazawal, V., Borriello, G., and Want, R. TiltType: accelerometer-supported text entry for very small devices, Proceedings of the 15th annual ACM symposium on User interface software and technology, Oct. 27-30, 2002, Paris, France.

Pirhonen, A., Brewster, S., and Holguin, C. 2002. Gestural and audio metaphors as a means of control for mobile devices. In Proceedings of the SIGCHI Conference on Human Factors in Computing Systems: Changing Our World, Changing Ourselves (Minneapolis, Minnesota, USA, Apr. 20-25, 2002). CHI '02. ACM Press, New York, NY, 291-298. http://doi.acm.org/10.1145/503376.503428.

Prevalent Devices LLC, http://www.prevalentdevices.com/manual3-5-06.pdf.

Qualcomm Slingshot, http://wireless.ign.com/articles/657/657041p1.html.

Rakkolainen, I. (2003). MobiVR—a novel user interface concept for mobile computing. In: Bieber, K. & Kirste, T. (eds.), Proceedings of the 4th International Workshop on Mobile Computing, IMC 2003, Jun. 17-18, 2003, Rostock, Germany, pp. 107-112. http://www.cs.tut.fi/~ira/IMC2003.pdf.

Rekimoto, J. Tilting operations for small screen interfaces. Proceedings of the 9th annual ACM symposium on User Interface software and technology, pp. 167-168, Nov. 6-8, 1996, Seattle. http://portal.acm.org/citation.cfm?id=237115&coll=GUIDE&dl=GUIDE&CFID=66483658&CFTOKEN=36023921.

Rosenberg, R. (1998). Computing without Mice and Keyboards: Text and Graphic Input Devices for Mobile Computing. Ph.D. Thesis, Dept. of Computer Science, University College, London, 1998. http://www.obscure.org/rosenberg/.

Samsung Game Pad, http://www.cellphonemall.net/wireless/store/accessorydetail.asp?id=23198&phoneid=334.

Scott MacKenzie, Hedy Kober, Derek Smith, Terry Jones, Eugene Skepner, LetterWise: prefix-based disambiguation for mobile text input, Proceedings of the 14th annual ACM symposium on User interface software and technology, Nov. 11-14, 2001, Orlando, Florida.

Sega into cell phones, http://www.phoneyworld.com/newspage.aspx?n=1745.

Sengital Ltd. Tilt sensor replacement for PDA, http://sengital.manufacturer.globalsources.com/si/6008823523892/ProductDetail/PDA-keyboard/product_id-1001050135/action-GetProduct.htm.

Sharp Vodafone ZTCJ01, http://www.slashphone.com/93/3123.html.

Sony Clie game controller PEGA-GC10, http://www.palminfocenter.com/view_story.asp?ID=4295.

Soukoreff, R. W. and MacKenzie, I. S. (2004). Recent Developments in Text-Entry Error Rate Measurement. CHI 2004, Late Breaking Results Paper, Vienna Austria, Apr. 24-29, 2004.

Starner, T. "Keyboards Redux: Fast Mobile Text Entry". Pervasive Computing, Jul.-Sep. 2004, pp. 97-101. http://www.cc.gatech.edu/fac/Thad.Starner/p/magazine/2004-3-keyboard-redux.pdf.

Synaptics, http://www.synaptics.com/products/pdf/mobiletouch_pb.pdf.

Tegic—T9, http://www.tegic.com/pdfs/salessheets/T9%20Adaptive%20Text%20Input%20Sales%20Sheet%201.pdf, http://www.tegic.com/pdfs/salessheets/T9%20Adaptive%20Text%20Input%20Sales%20Sheet%202.pdf, http://www.tegic.com/pdfs/salessheets/T9%20Adaptive%20Text%20Input%20Sales%20Sheet%203.pdf, http://www.tegic.com/pdfs/salessheets/Sloppy%20Type%20Sales%20Sheet.pdf.

The GamePad, http://www.kotaku.com/gaming/cell-phones/killer-cell-phone-game-controller-130968.php.

Thumbscript, http://www.thumbscript.com/index.html, http://www.thumbscript.com/howitworks.html, http://www.thumbscript.com/technotes.html.

Twiddler, http://www.handykey.com/, http://www.handykey.com/Keymap.pdf.

Unidentified and Undated Document discussing alternative designs to QWERTY Keyboard, pp. 2-10.

Varatouch: sensor company, http://www.esato.com/news/article.php/id=388.

Virpi Roto, Nokia Research. Browsing on Mobile Phones. http://www.research.att.com/~rjana/WF12_Paper1.pdf.

Wigdor, D. and Balakrishnan, R. "A Comparison of Consecutive and Concurrent Input Text Entry Techniques for Mobile Phones", Conference on Human Factors, Apr. 24-29, 2004, vol. 6, No. 1, pp. 81-88, http://portal.acm.org/citation.cfm?id=985703, http://www.dgp.toronto.edu/~ravin/papers/chi2004_concurrenttextinput.pdf.

Wobbrock, J. O., Forlizzi, J., Hudson, S. E. and Myers, B. A. WebThumb: interaction techniques for small-screen browsers. Proc. UIST, ACM Press (2002), 205-208.

XEG Mobile Phone Pad, http://us.gizmodo.com/gadgets/cellphones/gaming-on-the-go-with-xeg-136414.php, http://www.akihabaranews.com/en/news-10615-XEG%2C+the+mobile+phone+pad.html.

Yuvee: special keypad layout, www.yuvee.com, http://www.yuvee.com/builtin1.shtml, http://www.yuvee.com/built_in_b.shtml, http://www.yuvee.com/testdrive2.shtml.

Zhai, S., Smith, B.A., and Selker, T. Improving Browsing Performance: A study of four input devices for scrolling and pointing tasks, Proceedings of the IFIP TC13 Interantional Conference on Human-Computer Interaction, p. 286-293, Jul. 14-18, 1997.

Zicorp—eZiTap, http://www.zicorp.com/eZiTap.htm.

Communication from the European Patent Office dated Feb. 11, 2009.

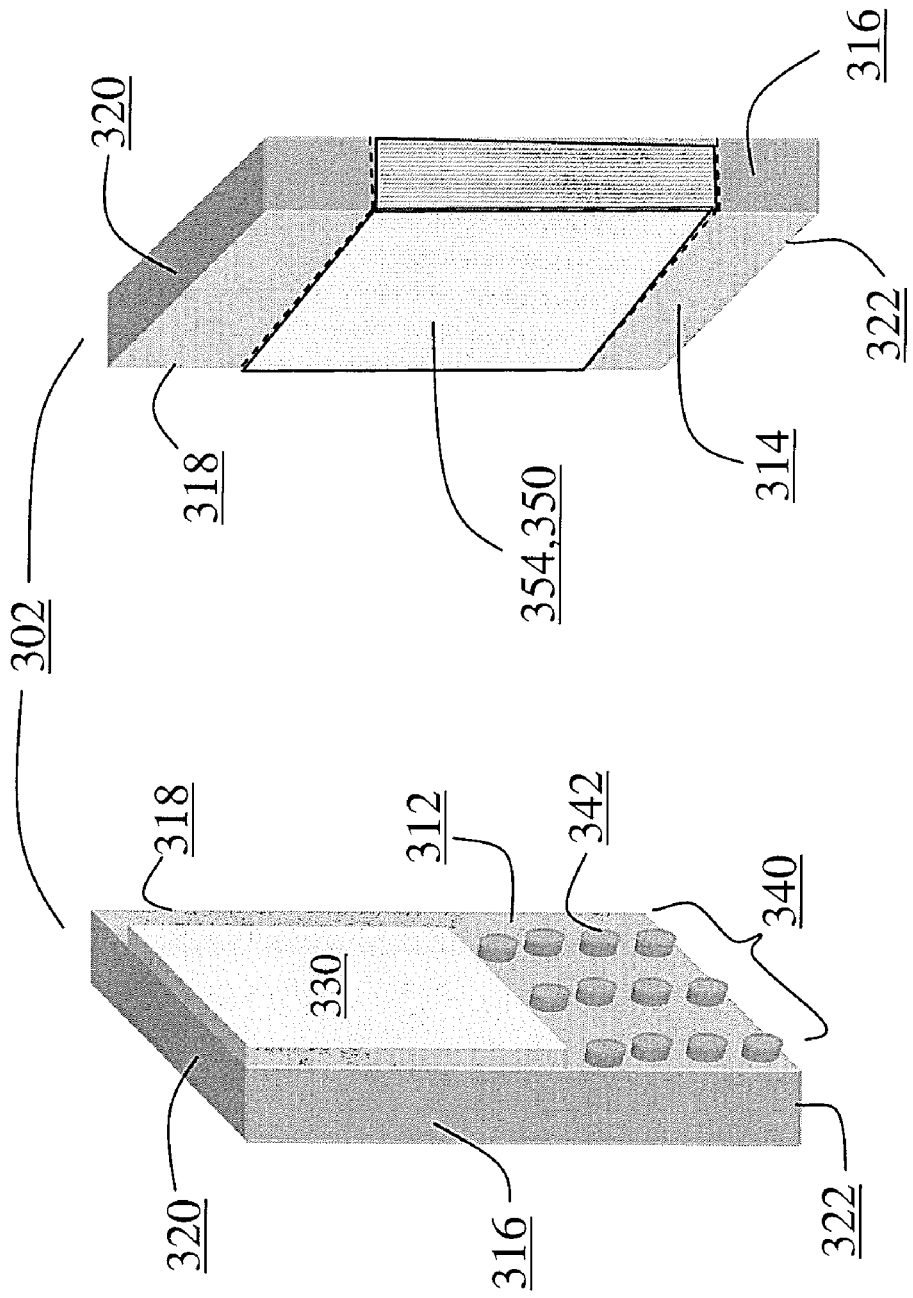

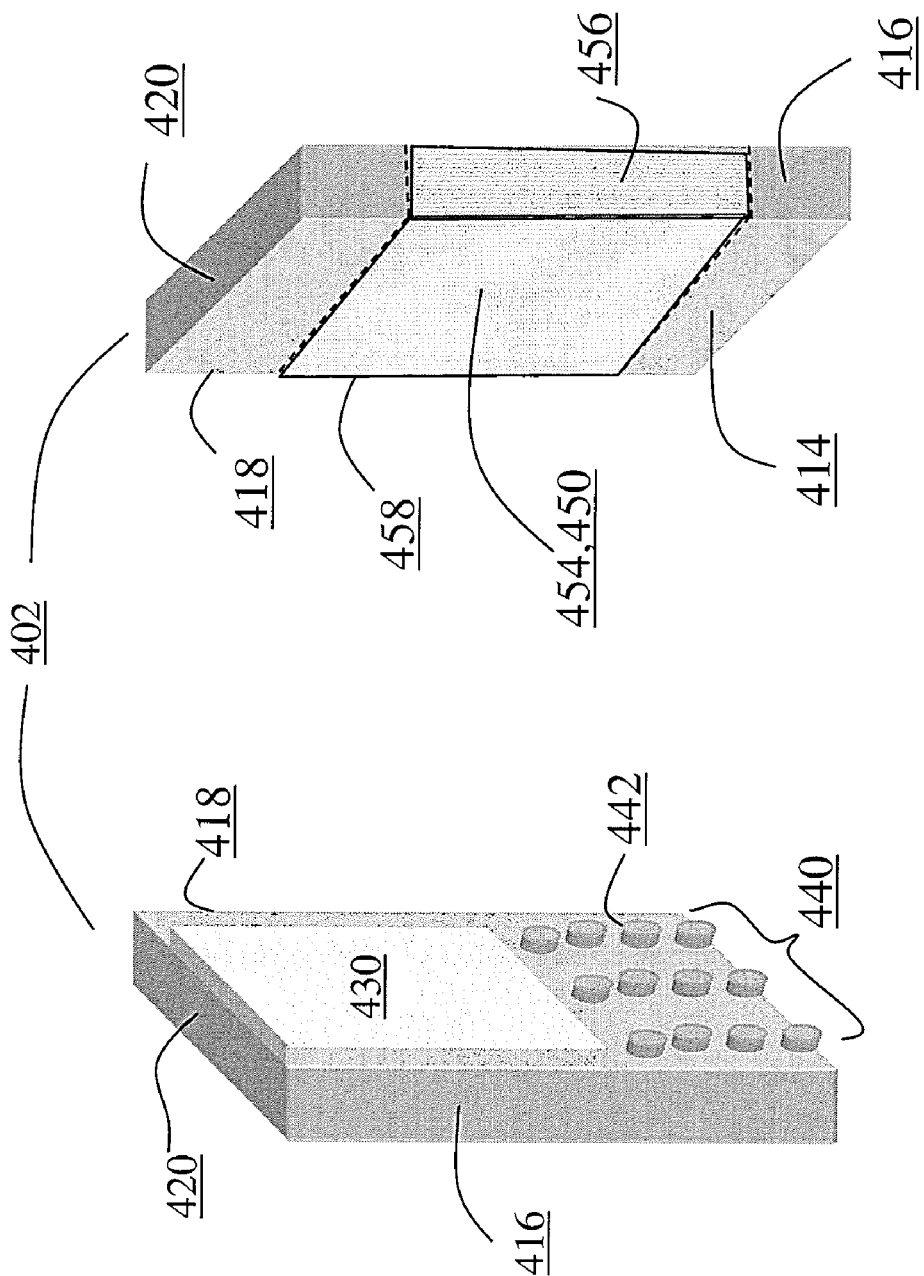

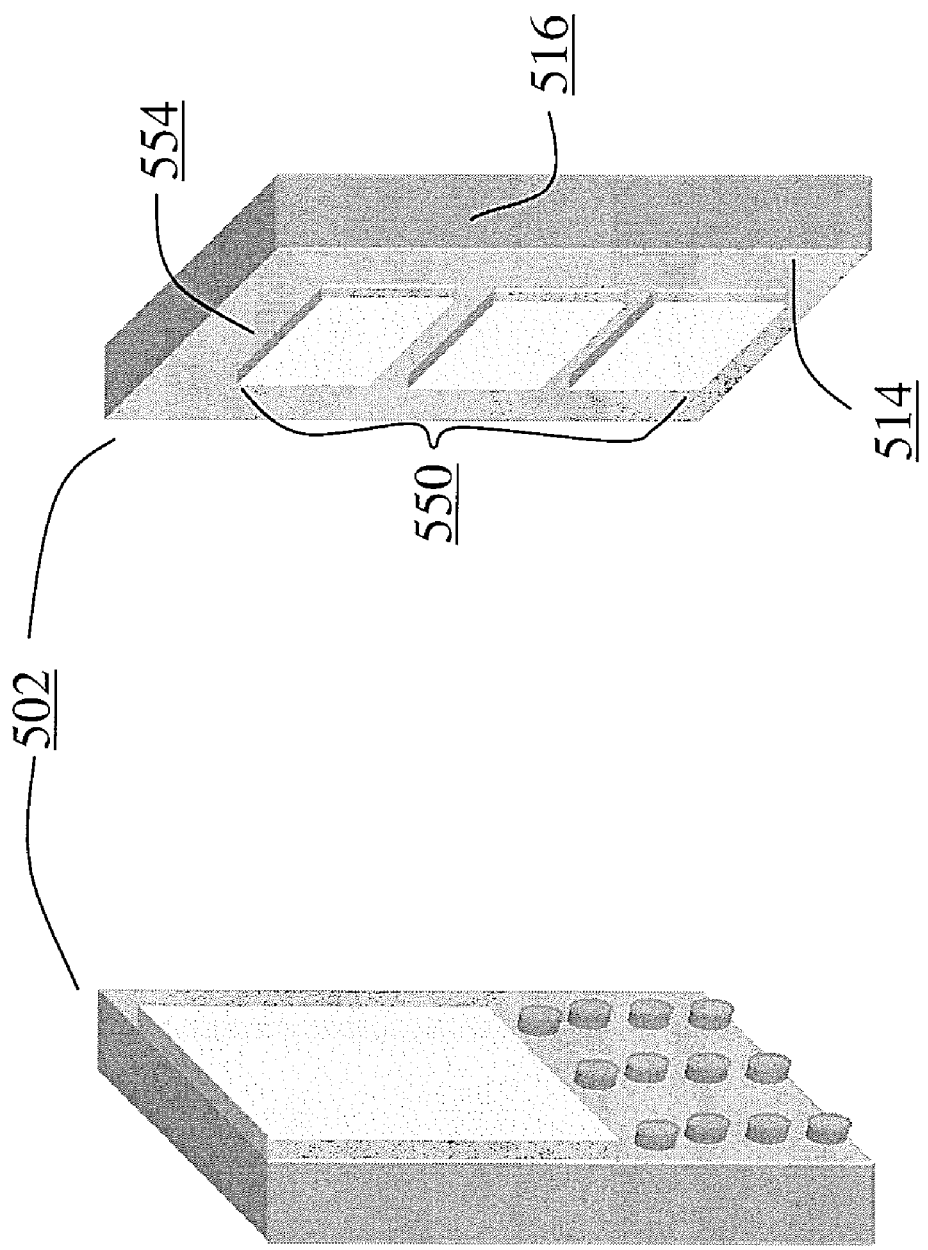

HUMAN INTERFACE SYSTEM

PRIORITY INFORMATION

This application is a continuation of U.S. application Ser. No. 11/747,863, filed on May 11, 2007, and claims priority under 35 U.S.C. 119(e) to U.S. application Ser. No. 11/747,863, filed on May 11, 2007; and to U.S. application Ser. No. 10/699,555, filed on Oct. 31, 2003; and the disclosure of the prior applications is considered part of (and is incorporated by reference in) the disclosure of this application.

BACKGROUND

The following description relates to human interface and input systems for electronic devices, particularly hand-held electronic devices, such as cell phones, personal digital assistants ("PDAs"), pocket personal computers, smart phones, hand-held game devices, bar-code readers, remote controls, and other similar input devices having a keypad or one or more input elements.

Electronic devices have become increasingly sophisticated and physically smaller due in part to a decrease in the price of processing power and a concurrent increase in demand by consumers for smaller devices. Such devices, however, tend to be limited in function and utility by the user's ability to interface with the device for data input (e.g., text, numeric, and functional input) and/or device control, which becomes increasingly more difficult to do as the available space on the device's surface for positioning the input elements, which are used for data input and/or device control, continues to decrease.

Various human interface and input systems and techniques for hand-held electronic devices have been developed for data input and device control. These include miniature keyboards and keypads used in combination with chordal input techniques, modal input techniques and/or smart keys; and touch screens used in combination with on-screen keyboard or keypad software or hand-writing recognition software.

Keyboard or Key Pad Used with Chordal, Modal and Smart Key Techniques

Miniature keyboards and keypads are similar to their standard full-size versions—i.e., a keyboard generally has a full set or substantially full set of numeric, character, and functional input elements, while key pads typically have a reduced set of numeric, character and/or functional input elements compared to keyboards. These miniature input devices typically are designed to fit the available space on one surface of a hand-held electronic device or are designed as small, easily transportable, external plug-in devices. Thus, as hand-held electronic devices become smaller, the size of the input elements typically has been reduced in order for the desired number of input elements to fit on one surface of the electronic device.

For data input and device control, miniature keyboards and keypads typically either require one of two input techniques—use of one or more thumbs or fingers to press the desired input elements or use of a stylus to "peck" the desired input elements (which is usually done where the input element is of smaller size). Various techniques, such as chordal input techniques, modal input techniques and smart keys, have been developed and implemented to improve the efficiency and effectiveness of using miniature keyboards and keypads.

Chordal Input Techniques

Chordal input techniques generally are based upon the principle that characters, symbols, words, phrases or concepts can be represented by a reduced set of input elements. Thus, by only having to press a reduced combination of input elements, functionality can be increased and quicker and more accurate data input can be realized. Chordal input techniques can be used on any keyboard or keypad configuration or any device having more than one input element, and typically results in fewer input elements or more functions compared to conventional keyboards or keypads. An example of an electronic device using two-handed chordal input techniques is a court reporter or stenographer's typewriter. One chordal input technique using a keypad to decrease the number of actuations to achieve a large number of functions is described in U.S. Pat. No. 5,973,621 to Levy, entitled "Compact Keyed Input Device," which is incorporated herein by reference.

Modal Input Techniques

Modal input techniques are based on the concept that functions of the electronic device, e.g., text messaging in a cellphone or PDA, can be accessed by pressing a particular input element (or combination of elements) on a keyboard or keypad. Once that particular input element is pressed, the functionality of all or a portion of the input elements on the keyboard or keypad may change. Modal techniques typically are used in calculators, cell-phones, and PDAs. For example, in cell phones, a modal technique called multi-tap is common, in which individual input elements on the keypad are associated with multiple symbols, such as characters, letters, numbers, icons or other types of symbols, which tends to reduce the number of input elements required to achieve the desired functions, e.g., a twelve-input-element keypad can be used to represent all letters of the English alphabet and the decimal digits. A user can input a desired symbol within a set of symbols associated with a certain input element by tapping on that particular input element with a thumb, finger, or stylus, one or more times to input the desired character. Thus, if a user desires to send a text message, the user may press a functional input element, e.g., a mode key, to access the text messaging functionality of the cell phone and then tap an individual input element one or more times to select the associated symbol for input. The number of taps needed to input a particular symbol may differ depending on the language character set chosen. For example, Japanese keypad or keyboards typically require a minimum set of 46 characters for text input, while English or American keyboards and keypads usually require a minimum set of 26 characters for text input. These modal input techniques have gained some popularity as users perform more text functions.

Smart Keys

Smart keys are typically used on keypads and refer to a single key or combination of keys that, when pressed, predict the users next logical action. Some implementations work better than others and some applications reduce the number of keystrokes required to complete a function better than others. Word-predictor software, for example, attempts to predict the word or character the user intends to input based upon one or more letters inputted by the user and the likely probabilities within a given language. The probability of the software guessing correctly increases with the length of the word or number of letters or characters inputted. In a device using smart keys on the keypad, a user may tap the keys 2, 2 and 8 in sequence to generate the word "cat" and the device would display that word first because it is usually the most common combination, whereas the word "bat," which can be generated by pressing the same keys, would not be displayed first because it is not as common. Also, the word "cat" may be displayed after pressing the 2 key the second time based on a guess by the word-predictor software.

Smart keys also are typically used for Japanese data input where a user phonetically inputs letters representing the sound of the Japanese character (e.g., a Kanji character). Based on the inputted letters, the predictor software guesses the Japanese character. To select the character, a user would press the accept button or use the scrolling function to go to the next character with a similar set of phonetic inputs.

Touch Screen Using On-Screen Keyboard or Handwriting Recognition Software

Using on-screen keyboard or keypad software with a touch screen offers users the ability to enter data with fingers or thumbs on a screen-sized keyboard or buttons, allowing faster data input without a stylus or physical keyboard or keypad accessory; while using handwriting recognition software with a touch screen, such as GraffitiO on the Palm operating system, offers users the ability to enter text with a stylus by writing the text directly on the touch screen. Touch screens usually consume more power and are more expensive than non touch-sensitive screens. This higher power consumption can be a problem for hand-held electronic devices, which typically have limited power resources. Moreover, touch screens usually require the user to use both hands (e.g., one hand is used to hold and steady the device while the other hand is used to grasp the stylus), which is generally undesirable for interfacing with and controlling one handed hand-held electronic device, such as cell phones. Handwriting recognition software has improved the slowness and awkwardness inherent in stylus, finger or thumb input but other drawbacks still remain, such as high power consumption, the necessity to use both hands, and lack of tactile feedback to inform a user when an input element has been. Moreover, recognition software requires training to use properly, and, even then, still results in a high error rate.

Game Control

For game control, many of the above approaches have been used, but in most hand-held electronic devices, a user typically controls game play through the use of some form of input element, such as on a miniature keypad and/or directional pad ("D-pad"), which typically is located on the front surface of the device. Game control on some hand-held electronic devices, such as cell phones, is inherently one handed or at most two thumbed because of the size of the device, while game control on other hand-held electronic devices, such as PDAs and conventional game console controllers, is typically two-handed. The input elements associated with game control on these devices are typically digital even though analog input elements have been used on game controllers for PC and console game systems, such as Microsoft's Xbox or Sony's Play Station 2.

SUMMARY

The present inventors recognized that conventional human interface and input systems for hand-held electronic devices tended to be relatively inflexible, cumbersome, and inefficient to use, among other reasons, because they were not designed to take advantage of the biomechanics of the human hand, particularly the advantages associated with the opposition of the thumb to the fingers and the beneficial attributes of the thumb, e.g., its large range of motion and ability to impart large sustained forces, and the beneficial attributes of the fingers, e.g., their fine motor control, spatial memory and rapidity of motion.

The present inventors also recognized that the input techniques developed to improve the efficiency of data input and device control, such as chordal and modal techniques, were limited by the inefficiencies inherent in conventional input systems. For example, miniature keyboards and keypads used in combination with chordal input techniques not only required the user to memorize numerous input combinations and develop the necessary motor skills to control a reduced number of input elements to provide even more complex functionality compared to typical QWERTY keyboards, but also did not use or allocate input tasks to the fingers and thumb of the human hand effectively. Moreover, miniature keyboards and keypads used in combination with modal input techniques tended to limit the user's ability to efficiently input data depending on the number of taps required to input a particular symbol and how fast the user could tap the input element with his thumb or a stylus to select the particular symbol.

The present inventors also recognized that a user's ability to control game play in such devices was greatly limited. For example, while analog game control has been available to users of PC and console game systems, analog game control generally has not been widely available on hand-held electronic devices, such as cell phones and PDAs. Moreover, because the game controls for conventional hand-held electronic devices were typically positioned on the front surface of the device, the user's hand typically obscured the user's view of the video screen. Also, the "fast twitch" control (e.g., a trigger) for shooting or activating special purpose game controls, which users have come to expect in console and PC game systems, generally has not been available to users of such hand-held electronic devices due in part to the nature of conventional interface and input systems, which were optimized for data input rather than for game control.

Consequently, the present inventors developed a flexible and efficient human interface and input system and techniques for hand-held electronic devices (whether one handed or two handed) that utilize the opposed thumb and finger ergonomics inherent in the hand and the skills already developed for using conventional input techniques to accomplish data input, device control and game control in a timely, efficient, comfortable and intuitive manner. Thus, no specialized training beyond that normally expected with any newly purchased hand-held device is expected.

Implementations of the human interface and input system for hand-held electronic devices described here may include various combinations of the following features.

The human interface and input system for a hand-held electronic device may be configured to include on a first surface a plurality of input elements that can be manipulated by one or both of a human user's thumbs or a stylus. At least one of the input elements may be configured in software to provide access to a plurality of input functions. For example, one of the input elements may provide access to the text symbols 5, j, k and l, while another input element may provide access to the text symbols 3, d, e and f, such as is found on a typical cell phone keypad. The human interface and input system also includes on a second surface one or more selection elements that may be manipulated by any of the human user's fingers. The selection elements may be associated with one or more input functions, which may be configured in software. For example, the selection elements may be configured to correspond to a particular shift position. Therefore, when a user manipulates a selection element, which is configured to correspond to a third shift position, for example, then the input function that may be accessed by a particular input element will be the third input function associated with the input element. In the example provided above, the third input function may be the text symbol "k" for the input element that provides access to the text symbols 5, j, k and l.

One of the selection elements may be a pressure sensor pad that can be configured to represent a plurality of delineated active areas, as well as inactive areas. These delineated active areas likewise can be configured in software to represent one or more input functions. A shape changing media also may be provided with the pressure sensor pad so as to permit a human user to tactilely discriminate between the plurality of delineated active areas and/or inactive areas.

The input elements and/or selection elements also may be associated with a palpable detent, vibratory unit and/or force producing unit, which may provide tactile feedback to the user when the user manipulates the elements or in response to events occurring in a software application running on a processor.

The human interface and input system also may be configured to include a first input assembly and a second input assembly. The first input assembly may include a plurality of input or selection elements situated on one or more surfaces of the electronic device and configured to be easily and comfortably actuated by one or both of a human user's thumbs or a stylus. The second input assembly may include one or more input or selection elements situated on one or more surfaces of the electronic device and configured to be easily and comfortably actuated by one or more of the human user's fingers. The first input and second input assemblies may be disposed on one or more surfaces of the hand-held electronic device to take advantage of the full range of opposition configurations of the thumb and the fingers. Sensing circuitry, such as an input controller, may be provided to receive signals generated by the elements of the first and/or second input assemblies when the elements are manipulated by the human user and convert those signals in a form suitable to be received by a processor running application software, which based on the received signals, can determine the type of input provided by the human user.

The first input assembly may be situated on a front surface of the electronic device, while the second input assembly may be situated on the back surface of the electronic device to take advantage of the thumb/finger opposition. As configured, a user may manipulate input elements in the first input assembly with one or both thumbs or a stylus, while, manipulating elements in the second input assembly with one or more fingers.

The input function of the input elements of the first and/or the second input assembly may change depending on the application running on the electronic device. When a text application (e.g., e-mail, word processing, or text messaging) is running on the electronic device, the elements of the first and/or second input assembly may be associated with data input keys, such as symbols. When a game application is running on the electronic device, the input elements of the first and/or second input assembly may be associated with game controls, such as a directional control, action buttons, and trigger buttons. The mapping of one or more of the input elements of the first and/or second input assembly to a software application, i.e., whether one or more of the input elements will operate as data input keys, game controls or device controls can be customized by the software application developer or the user through downloads or other programming modalities. Moreover, to reduce the cost of manufacturing hand-held electronic devices that will be used in multiple countries, input element sets particular to the language of a desired country can be implemented in software.

The systems and techniques described here may provide one or more of the following advantages. The human interface and input system and associated techniques offer the functionality of a high performance game controller, which can support the most demanding game input requirements, and the speed and accuracy of data input that can be obtained with the use of a conventional standard QWERTY keyboard, but without the large footprint. Also, the human interface and input system and associated techniques can increase the number of functions that may be associated with a given number of input elements without increasing the number of keystrokes or taps that is required. Moreover, it allows the input element size to remain consistent with the ergonomics of the human hand without increasing the time it takes to learn how to use the input system compared to conventional input systems.

Details of one or more implementations are set forth in the accompanying drawings and the description below. Other features and advantages will be apparent from the description and drawings, and from the claims.

DESCRIPTION OF DRAWINGS

FIGS. 3a and 3b show front and back isometric views, respectively, of a hand-held electronic device wherein the second input assembly includes a pressure sensor pad having a plurality of configurable active areas.

FIGS. 4a and 4b depict front and back isometric views, respectively, of a hand-held electronic device wherein the second input assembly includes three touch pads.

FIGS. 5a and 5b depict front and back isometric views, respectively, of a hand-held electronic device wherein the second input assembly includes three two-position rockers.

Like reference symbols in the various drawings indicate like elements.

DETAILED DESCRIPTION

Biomechanics of the Human Hand

The human hand comprises an opposable thumb and four fingers, i.e., the thumb may be used in opposition, in concert, in combination or functional relation with any of the four fingers. Compared to the human fingers, the human thumb may be characterized as having larger range of motion, stronger sustaining force actuation and poorer dexterity. The human base joint of the thumb has three degrees of freedom, such as side-to-side movement, up and down movement, and rotation about the thumb's long axis; while the base joint of the fingers has two degrees of freedom, such as side-to-side and up and down movement. Thus, the thumb typically is considered to have better range of motion than any of the fingers. Also, because the human thumb has a bigger actuation muscle than any of the fingers, it can provide larger sustaining forces than the fingers. But also because of the larger muscle, the human thumb may suffer from diminished fine motor control and rapidity of motion that can be exerted compared to the fingers. Thus, the human fingers are more suitable for performing tasks that require fine motor coordination or the ability to pinpoint or rapidly repeat actuation.

Hand-Held Electronic Device Hardware Overview

Figure 1:
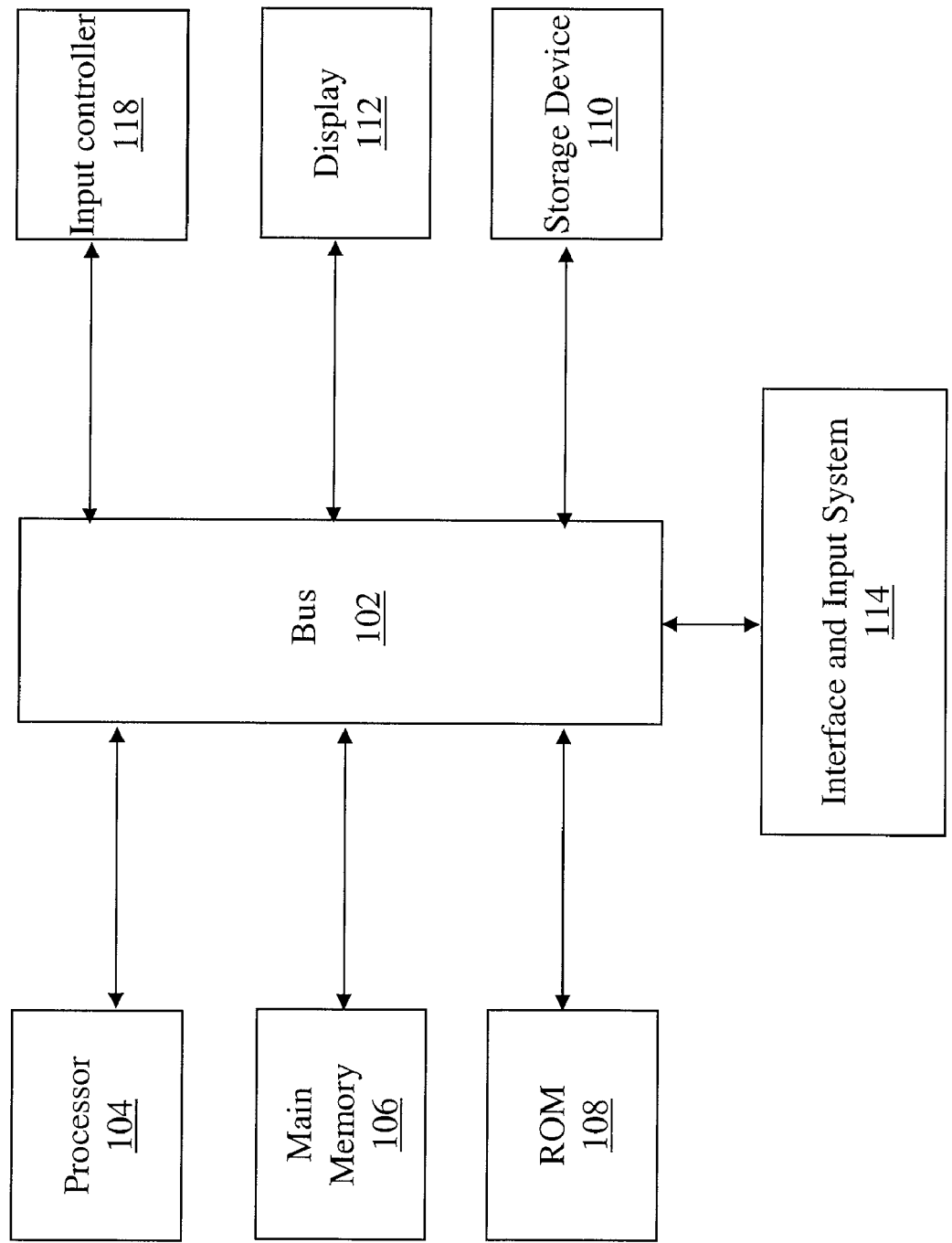
FIG. 1 is a block diagram of a typical hand-held electronic device upon which the human interface and input system may be implemented.

FIG. 1 is a block diagram that illustrates a hand-held electronic device 100, such as a cell-phone, PDA, pocket PC, or smart phone, or other similar input devices upon which the human interface and input system and associated input techniques described herein may be implemented. Electronic device 100 may include a bus 102 or other communication mechanism for communicating information, and a processor 104, such as an ARM, OMAP or other similar processor, coupled with bus 102 for processing information, such as one or more sequences of one or more instructions, which may be embedded software, firmware, or software applications, such as a text messaging application or video game. Electronic device 100 also may include a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Electronic device 100 further may include a read only memory (ROM) 108 or other static storage device coupled to bus 102 for storing static information and instructions for processor 104. A storage device 110 may be provided and coupled to bus 102 for storing information and instructions. Electronic device 100 may also include a display 112, such as a liquid crystal display (LCD), for displaying information to a user, and a human interface and input system 114 for communicating information and command selections to processor 104. Electronic device 100 also may include a communication interface 118 coupled to bus 102. Communication interface 118 provides a two-way data communication coupling to a base station. For example, communication interface 118 may be a wireless link, a modem to provide a data communication connection to a corresponding type of telephone line or any other communication interface known to one of ordinary skill. As another example, communication interface 118 may be a local area network (LAN) card to provide a data communication connection to a compatible LAN. In the wireless link implementation, communication interface 118 may send and receive electrical, electromagnetic or optical signals that carry digital data streams representing various types of information.

Human Interface and Input System Overview

Figure 2:
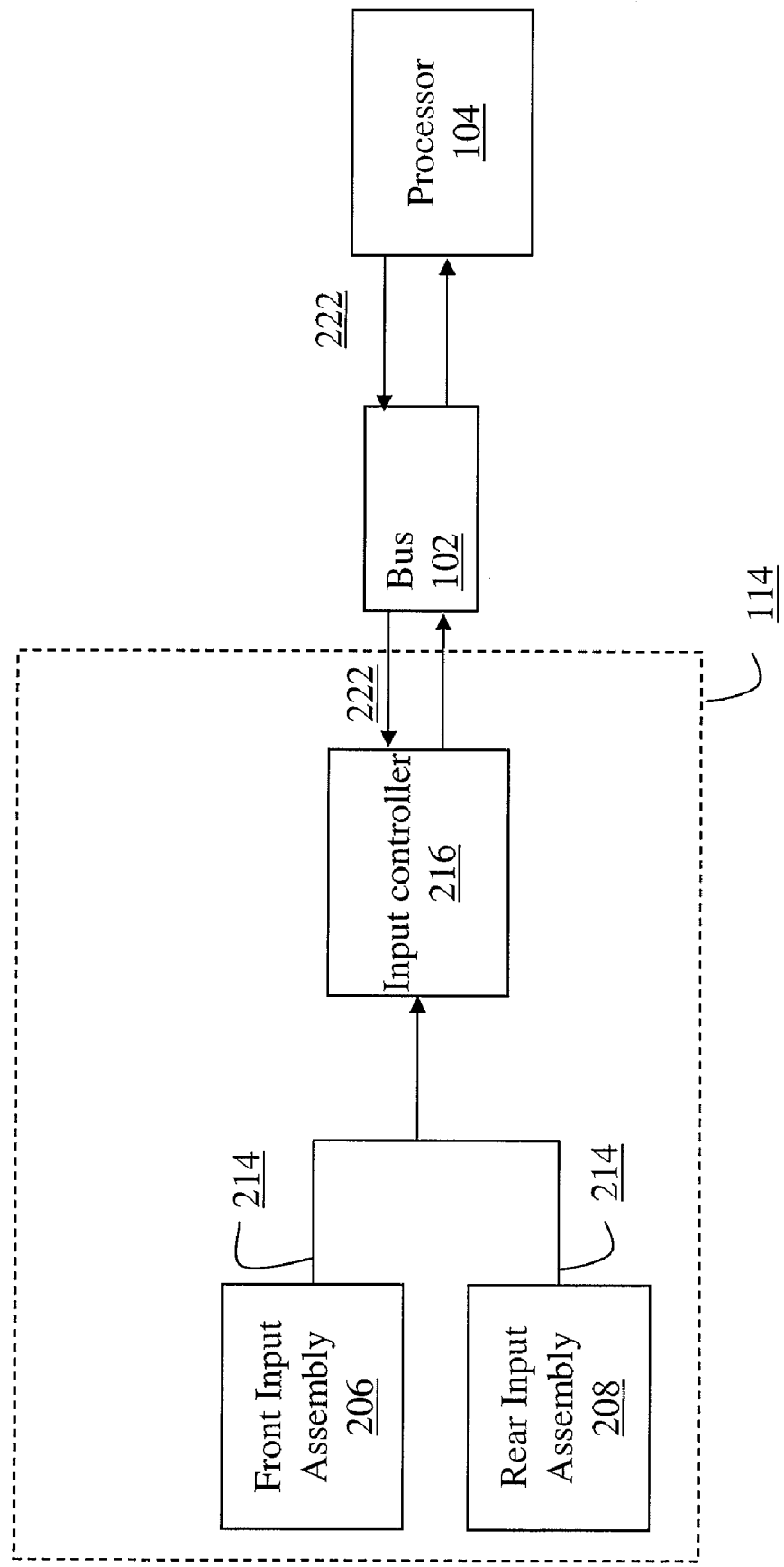
FIG. 2 is a block diagram of an implementation of the human interface and input system.

FIG. 2 is a block diagram illustrating the major subsystems of the human interface and input system 114. The input system 114 may include a first input assembly 206, a second input assembly 208, and an input controller 216. The first input assembly 206 and the second input assembly 208 may include one or more input or elements. The input or selection elements, which may be keys, buttons, pressure sensor pads, touch pads or other actuators, associated with one or more sensors, which produce one or more electrical signals 214 when the input or selection elements are actuated. The input controller 216, which may include one or more processors, receives the one or more electrical signals 214 and converts them into a form suitable to be received and interpreted by processor 104 after passing through bus 102.

One or more context signals 222 are provided to input controller 216 through bus 102 in response to processor 104 executing embedded software, firmware, or software applications, such as a text messaging application. The context signals 222 are received and used by input controller 216 to map input or selection elements in the first input assembly 206 and/or the second input assembly 208 to one or more application input functions and responses. For example, if a text application is being executed by processor 104, then the input controller 216 may map one or more input elements of the first input assembly 206 to one or more symbols, such as characters, letters, numbers, icons, other types of symbols, or combinations of different types of symbols, and map one or more input or selection elements of the second input assembly 208 to a shifting or indexing functionality. If processor 104 is executing a game application, then the input controller 216 may map the input or selection elements of the input assemblies 206, 208 to game functions. The mapping of the input or selection elements to particular input functions for a given software application, whether done by the input controller 216 or processor 104, may be customized by the application developer or the user through downloads or other programming modalities. Moreover, the mapping of the input or selection elements may be done for language key set changes, which may reduce the cost of manufacturing hand-held electronic devices for manufacturers servicing multiple countries.

Alternative implementations of the input system 114 need not have the input controller 216, particularly where cost is of a concern. In those instances, processor 104 may assume the functions of the input controller 216. Thus, processor 104 can perform the mapping function described above.

Human Interface and Input System and Techniques Implementations

FIGS. 3a and 3b illustrates front and back isometric views, respectively, of a hand-held electronic device 302 upon which an implementation of the human interface and input system may be implemented. Electronic device 302 may include six planar or contoured surfaces: a front-side surface 312, a back-side surface 314, a left-side surface 316, a right-side surface 318, a top-side surface 320, and a bottom-side surface 322. Although, in other implementations, electronic device 302 may have more or fewer planar and/or contoured surfaces. On the front-side surface 312, a display 330, such as an LCD, and a first input assembly 340 is disposed adjacent to each other. Alternatively, display 330 may be on a separate assembly such as those displays for PDA's and cell phones with a swivel-mounted screen or flip-phone configurations. Also, the first input assembly 340 may be disposed on more than one surface. The first input assembly may be a typical cell-phone keypad, which may include twelve input elements 342, although any number of input elements may be provided. A user's thumb or thumbs or a stylus may actuate the input elements 342.

A second input assembly 350 is disposed on the back-side surface 314, left-side surface 316 and right side surface 318. Alternatively, the second input assembly may be disposed on one of those surfaces or a combination of those surfaces. In this implementation, the first input assembly 340 is disposed relative to the second input assembly 350 to take advantage of the opposition of the human thumb and finger. The second input assembly 350 includes a pressure sensor pad 354 having a plurality of software configurable active areas, which may be actuated by one or more of the user's fingers. The pressure sensor pad 354 in this implementation may include an actuator, such as an elastomeric material, attached to a force sensitive resistor array, a capacitive mat or array, or other similar pressure sensitive device or grid that can provide multiple outputs corresponding to the pressure readings of the plurality of active areas on the pad's 354 surface. Here, the pressure sensor pad 354 wraps around from the left-side surface 316 across the back-side surface 314 to the right-side surface 318.

It is to be understood that the input elements 342, 354 in this implementation and any other implementation could be analog and/or digital buttons, keys, rockers (which may be a one or more position buttons or an analog joystick-type button), sliders, dials or touch pads used in combination with pressure sensors (such as force sensitive resistors, piezo resistive sensors, and capacitive sensors), positional sensors (such as rotary encoders, linear potentiometers and the like) or other sensors or a combination of them.

Figure 3D:
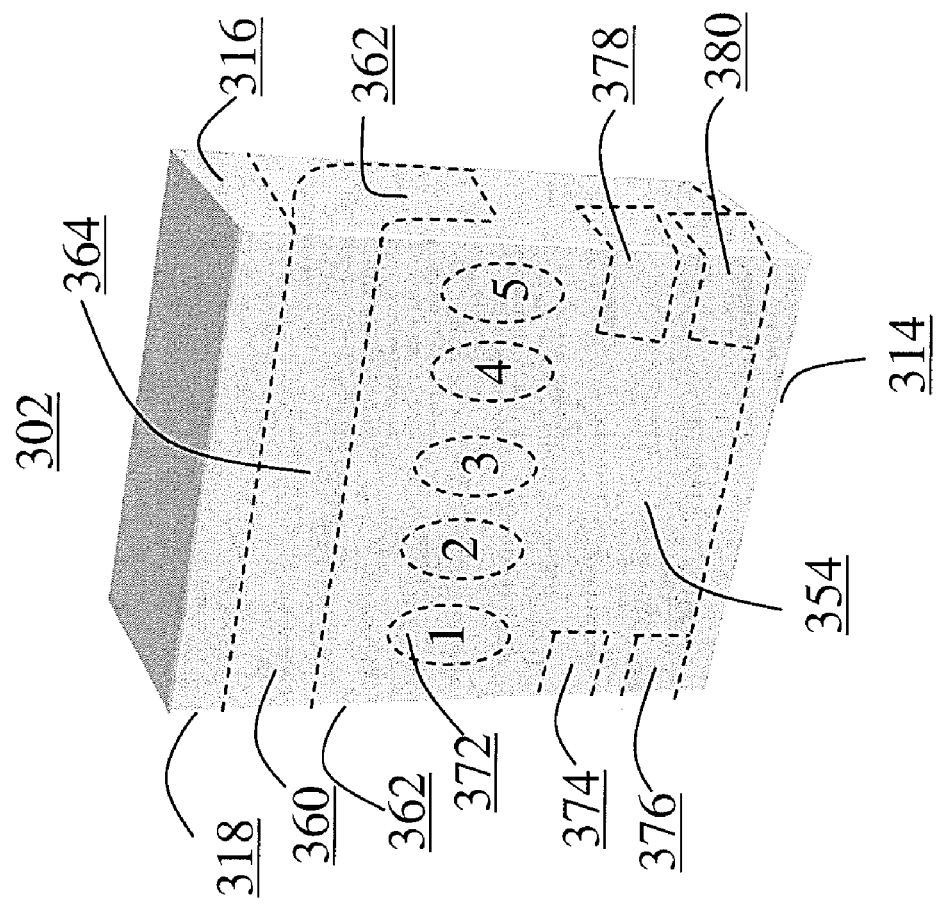
FIG. 3d depicts one implementation of how the plurality of configurable active areas of the pressure sensor pad of the second input assembly may be configured.
Figure 3C:
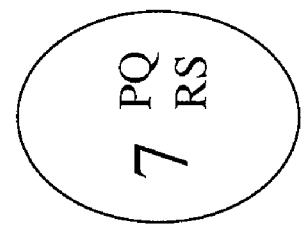
FIG. 3c illustrates an exploded view of an example of an input element of the first input assembly.

FIG. 3c depicts an exploded view of an input element 342 of the first input assembly 340, which is mapped to represent one or more text functions. Here, the input element is mapped to represent the number 7 and letters p, q, r and s, as is found on a typical keypad of a cell phone. Other input elements 342 may be associated with other letters, numbers and/or icons. For example, one input element may be associated with the number 4 and letters g, h and i, while another input element may be associated with the number 2 and the letters a, b and c.

As shown in FIG. 3d, the pressure sensor pad 354 may be configured in software to represent one or more delineated active areas corresponding to different programmable functions depending on the application. In this case, inverted U-shaped active area 360 forms an active area—the vertical sides 362 of the inverted U-shaped active area 360 are on the left-side surface 316 and the right-side surface 318 and the horizontal side 364 of the inverted U-shaped active area 360 is along the top edge of the pressure sensor pad 354 on the back-side surface 314. Below the inverted U-shaped active area 360 on the back-side surface 314 are five oblong-shaped active areas 372 labeled from 1 to 5. On the bottom of both the left-side surface 316 and the right-side surface 318 and stretching to the back-side surface 314 of the pressure sensor pad 354 are rectangular-shaped active areas 374, 376, 378, 380. The remaining area of the pressure sensor pad 354 may be configured to be inactive.

In this implementation, inverted U-shaped active area 360 may be used for navigation—the vertical sides 362 for y-directional movement and the horizontal side 364 for x-directional movement. The oblong-shaped active areas 372 may be used for shifting or indexing between symbols, such as characters, letters and/or numbers, or text input. The rectangular-shaped active areas 374, 376, 378, 380 may be used for shifting between modes—two of the active areas 374, 376 for left-handed users and the other two active areas 378, 380 for right-handed users. In another configuration of the pressure sensor pad 354, the entire surface of the pressure sensor pad 354 may be covered by horizontal rectangular active areas interspersed between small rectangular horizontal inactive areas to achieve any desired number of active areas. Other configurations of the pressure sensor pad 354 may be realized depending on the requirements of the desired application.

The delineated active areas of the pressure sensor pad 354 may be actuated by one or more of the user's fingers, such as by applying pressure against the delineated active areas of the pad 354 beyond a pre-defined or user-adjustable threshold pressure. Likewise, the absence of pressure may be used as an actuation event. The pressure sensor pad 354 also may contain or be mounted above or below a shape-changing media such as an electrorheastatic fluid, shape memory metal array or similar material, which can permit the user to tactilely discriminate between the one or more delineated active areas. Thus, the user will be able to perceive the one or more delineated active areas as if they were physical buttons. Also, a computer graphical representation (not shown) of the configuration of the delineated active areas of the pad 354 may be displayed temporarily (or some predetermined time) on a portion of the display 330 to visually assist the user in locating where the delineated active areas of the pad 354 are positioned. Moreover, an input element 342 of the first input assembly 340 may be mapped to activate and/or deactivate the displaying of the computer graphical representation.

The input architecture described above, with the first input assembly 340 on the front-side surface 312 and the second input assembly 350 on the back-side surface 314, left-side surface 316 and right-side surface 318, is configured to take advantage of the biomechanics of the hand, whether the user is left-handed or right-handed. This configuration, for example, can reduce the number of thumb taps required to input a particular symbol compared to the number of thumb taps or stylus presses required using only a typical key pad with modal input techniques, such as is found in conventional text input systems. Moreover, this configuration can permit full keyboard capability with fewer input elements on the first input assembly 340 and with greater spacing between input elements to enhance the ease of input compared to typical keypads for existing cell phones. Also, this configuration can permit full functionality of a high performance game controller, which can support the most demanding game input requirements.

A method to implement full keyboard capability and reduce the number of thumb taps is to map in software the delineated active areas of the pressure sensor pad 354, such as the oblong-shaped active areas 372, to an indexing or shifting functionality to take advantage of the capability of the human finger, i.e., rapidity of motion, spatial memory and fine motor control, and to map in software the input elements 342 of the first input assembly 340 to text functionality to take advantage of the capability of the human thumb, i.e., range of motion and sustained force actuation.

When a text messaging application is running on the electronic device 302 and displayed on the screen 330, the first input assembly 340 and the second input assembly 350 are used together to perform the text messaging functions. Each input element 342 of the first input assembly 340 may represent one or more text functions, e.g., one input element may be associated with the decimal digit 2 and letters a, b and c, while another input element may be associated with the decimal digit 7 and letters p, q, r and s (as shown in FIG. 3c), such as is found on typical keypads.

In this implementation, the input elements 342 are configured the same as a typical keypad on a cell phone. The specific text function inputted by a user for a particular input element 342 is determined by which delineated active area of the pressure sensor pad 354 is pressed. For example, going from left to right, each oblong-shaped active area 372 may be mapped to represent a separate index or shift position such that index position 1 may be assigned to the left-most oblong-shaped active area (labeled 1), index position 2 may be assigned to the adjacent oblong-shaped active area 372 (labeled 2) and so on, where index position 5 may be assigned to the right-most oblong-shaped active area 372 (labeled 5). Thus, to input the word "yes", the user may press the oblong-shaped active area 372 representing index position 4 with any of his fingers and press the particular input element 342 representing the letter "y" with his thumb; then the user may press the oblong-shaped active area 372 representing index position 3 with any of his fingers and press the input element 342 representing the letter "e" with his thumb; and then the user may press the oblong-shaped active area 372 representing index position 5 with any of his fingers and press the input element 342 representing the letter "s" with his thumb.

The coordination of finger motions and thumb motions in other than a grasping motion may be difficult for most people. Generally, doing two separate types of motions simultaneously can be difficult. However, the human interface and input system described herein does not require those types of motions due to the flexibility of the system. Generally, it is easier to tap both the fingers and thumbs or leave either the thumb or fingers in contact with an input element or delineated active area while moving the other. For example, a user's finger may press an oblong-shaped active area 372 at the same time or nearly the same time the user's thumb taps an input element 342 in the first input assembly 340.

Also, a user may tap an input element 342 with his thumb while pressing an oblong-shaped active area 372. Pressing or touching an oblong-shaped active area 372 while tapping on an input element 342 in the first input assembly 340 typically is natural, comfortable and easy to do. Likewise, the same holds true where the index finger moves substantially linearly from one oblong-shaped active area 372 to the next, generally a left to right motion or vice versa, while the thumb taps an input element 342 in the first input assembly 340.

Another way to implement finger/thumb coordination would be to permit asynchronous or sequential tapping between the finger tap and the thumb tap. For example, pressing an input element 342 within a pre-determined time (e.g., one second) after pressing and depressing a oblong-shaped active area 372 would constitute the same action as if both were pressed simultaneously. This time window could be configured by the user to facilitate different proficiencies in typing or different types of applications—for game applications, the time window could be quite short, whereas for text input applications, the time window could be much longer. The time window also could be different for different delineated active areas based on their intended function in a given application.

Another method to implement full keyboard capability and reduce the number of thumb taps is map in software the delineated active areas of the second input assembly 350 as follows: left vertical side 362 of the inverted U-shaped active area 360 to be shift position 1; anywhere along the horizontal side 364 to be shift position 2; the top-left rectangular-shaped active area 378 to be shift position 3; the top-right rectangular-shaped active area 374 to be shift position 4; the bottom-left rectangular-shaped active area 380 to be shift position 5; and, if needed, the bottom-right rectangular-shaped active area 376. The input elements 342 of the first input assembly 340 may again be mapped to text functionality.

Thus, to input the word "yes", the user may press the top-right rectangular-shaped active area 374 representing shift position 4 with any of his fingers and press the particular input element 342 representing the letter "y" with his thumb; then the user may press the top-left rectangular-shaped active area 378 representing index position 3 with any of his fingers and press the input element 342 representing the letter "e" with his thumb; and then the user may press the bottom-left rectangular-shaped active area 380 representing index position 5 with any of his fingers and press the input element 342 representing the letter "s" with his thumb.

A method of implementing the functionality of a game controller is to assign in software the input elements 342 of the first input assembly 340 specific game functions to take advantage of the capability of the human thumb, i.e., range of motion and sustained force actuation, and to map in software the delineated active areas of the pressure sensor pad 354 of the second input assembly 350 analog control to take advantage of the capability of the human finger, i.e., rapidity of motion, spatial memory and fine motor control. Thus, as a user's index finger or middle finger slides from left to right across the oblong-shaped active areas 372, the horizontal side 364 of the inverted U-shaped active area 360, and/or the rectangular active area 370, the input controller (not shown) may interpret the motion as "increasing" a parameter such as speed, size, position, etc. Alternatively, the input controller may be programmed to interpret different levels of applied pressure to these delineated active areas as the "increasing" parameter, i.e., increased pressured may represent increased speed, size, position, etc.

In this implementation, the vertical side 362 of the inverted U-shaped active area 360 may be programmed to represent the y-directional (vertical) movement of control of a character in a game, while the horizontal side 364 of the U-shaped active area 360 may be programmed to represent the x-directional (horizontal) movement. Movement into or out of the field of view may be controlled by the left and right rectangular buttons 374, 376, 378, 380, thereby allowing 3-D control. Rapid filing of weapons may be accomplished by using the input elements 342 of the first input assembly 340 or one of the five oblong-shaped active areas 372, with each one representing a different weapon or action. Complex moves or mode shifts could be accomplished by combining input elements 342 of the first input assembly 340 with any delineated active area of the second input assembly 350. In this way, a game developer may optimize the mapping of delineated active areas based on the best configuration for a particular game. For example, a game developer could set up control configurations for novice users differently than for advanced users, such as mapping different numbers or sizes of delineated active areas, in order to reduce the learning time to be proficient and make game control easier for first time players.

FIGS. 4*a* and 4*b* illustrate front and back isometric views, respectively, of a hand-held electronic device 402 similar to the device shown in FIGS. 3*a* and 3*b*, except the second input assembly 450 includes three input or selection elements 454, 456, 458, which may be rectangular-shaped touch pads. Each touch pad 454, 456, 458 may transduce the location of the contact of an object or a user's finger anywhere on its surface. Also each touch pad 454, 456, 458 may correspond to different programmable functions. Here, touch pad 454 may be disposed on the back-side surface 414; touch pad 456 may be disposed on the left-side surface 416; and touch pad 458 may be disposed on the right-side surface 418.

In a hand-held device such as a cell-phone or PDA, the second input assembly 450 may include a touch-pad located diagonally on the back-side surface 414 with another touch-pad on the left-side surface 416 because a right-handed user's index finger typically is placed along a diagonal path on the back-side surface 414 wrapping around to the left-side surface 416. In that case, second input assembly 450 may include touch pad 454 and touch pad 456. A user's finger may finger may move along the length of the touch-pad strip 454 in order to select the desired function. For example, a far left portion of touch-pad 454 may be mapped to be index position 1, a far right portion of touch-ad 454 may be mapped to be index position 5, and portions between the far-left portion and the far right portion of the touch-pad 454 may be mapped to intervening index positions. Alternatively, index position 1 may be mapped to touch pad 456 for right-handed users and mapped to touch pad 458 for left-handed users. Thus, in this implementation, text input is similar to that as described with respect to FIGS. 3*a* and 3*b*. Other configurations of the active areas of the touch pads 454, 456, 458 are possible and can be tailored to specific applications.

FIGS. 5a and 5b illustrate front and back isometric views, respectively, of a hand-held electronic device 502 similar to the device shown in FIGS. 3a and 3b, except the second input assembly 550 includes three input or selection elements 554, which may be actuated by any of the user's fingers, typically the user's index finger or middle finger or a combination of both. The input elements 554 in this implementation are conventional two-position rockers. Thus, the second input assembly 550 can provide six index positions at a relatively low cost with passive tactile feedback built in.

Figures 6A, 6B:
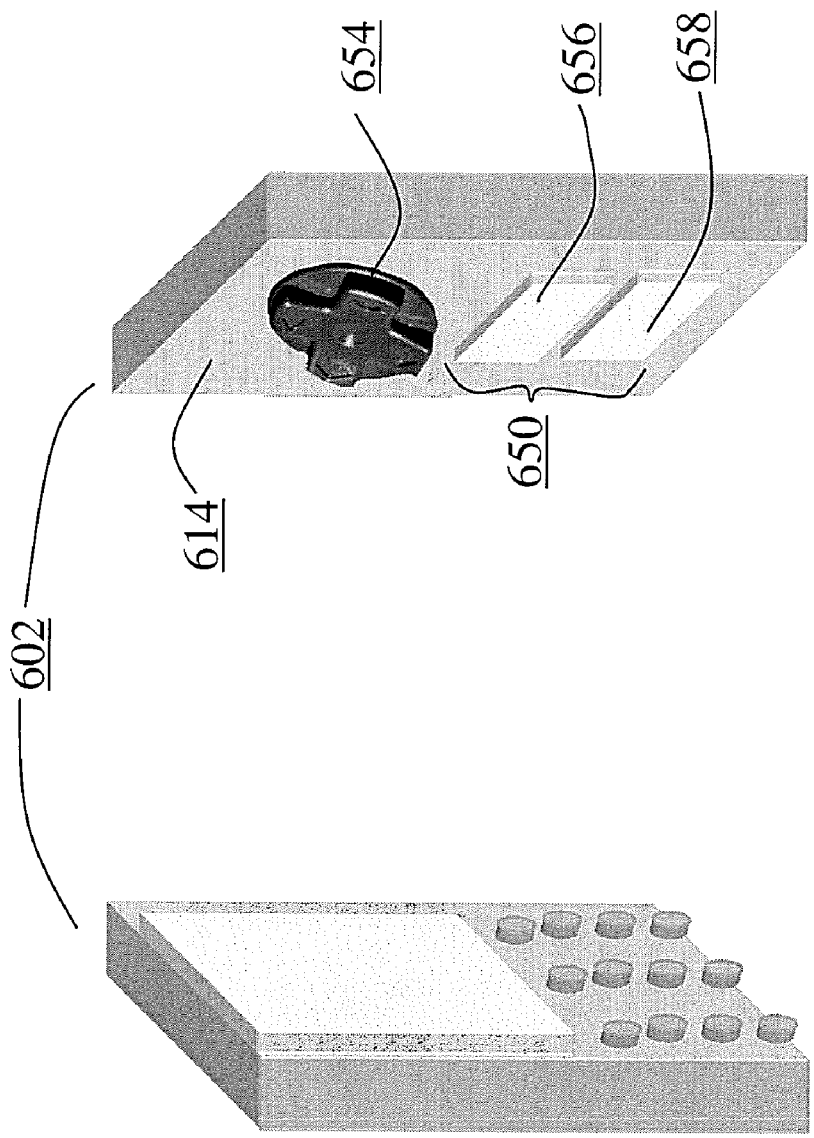
FIGS. 6a and 6b illustrate front and back isometric views, respectively, of a hand-held electronic device wherein the second input assembly includes a D-pad and two contact sensors.

FIGS. 6a and 6b illustrate front and back isometric views, respectively, of a hand-held electronic device 602 similar to the device shown in FIGS. 3a and 3b, except the second input assembly 650 includes three input or selection elements 654, 656, 658. Input element 654 may be a D-pad input device and input elements 656, 658 may be either digital or analog contact sensors. The D-pad 654 may be mounted on the center of the back-side surface 614 and mapped in software to represent one or more index or shift positions. For example, the D-pad 654 may be mapped to represent four index positions with each compass heading of the D-pad (e.g., North, South, East and West) representing a different index position. A fifth index position could be mapped to orthogonal movement of the center of the D-pad 654 into the device 602. Alternatively, the D-pad 654 may be mapped to represent eight index positions, e.g., the compass directions North, South, East, West, Northeast, Northwest, Southeast and Southwest may be mapped. The contact sensors 656, 658 may be used as mode functions, for firing weapons, or any other functionality specified by an application developer.

Figures 7A, 7B:
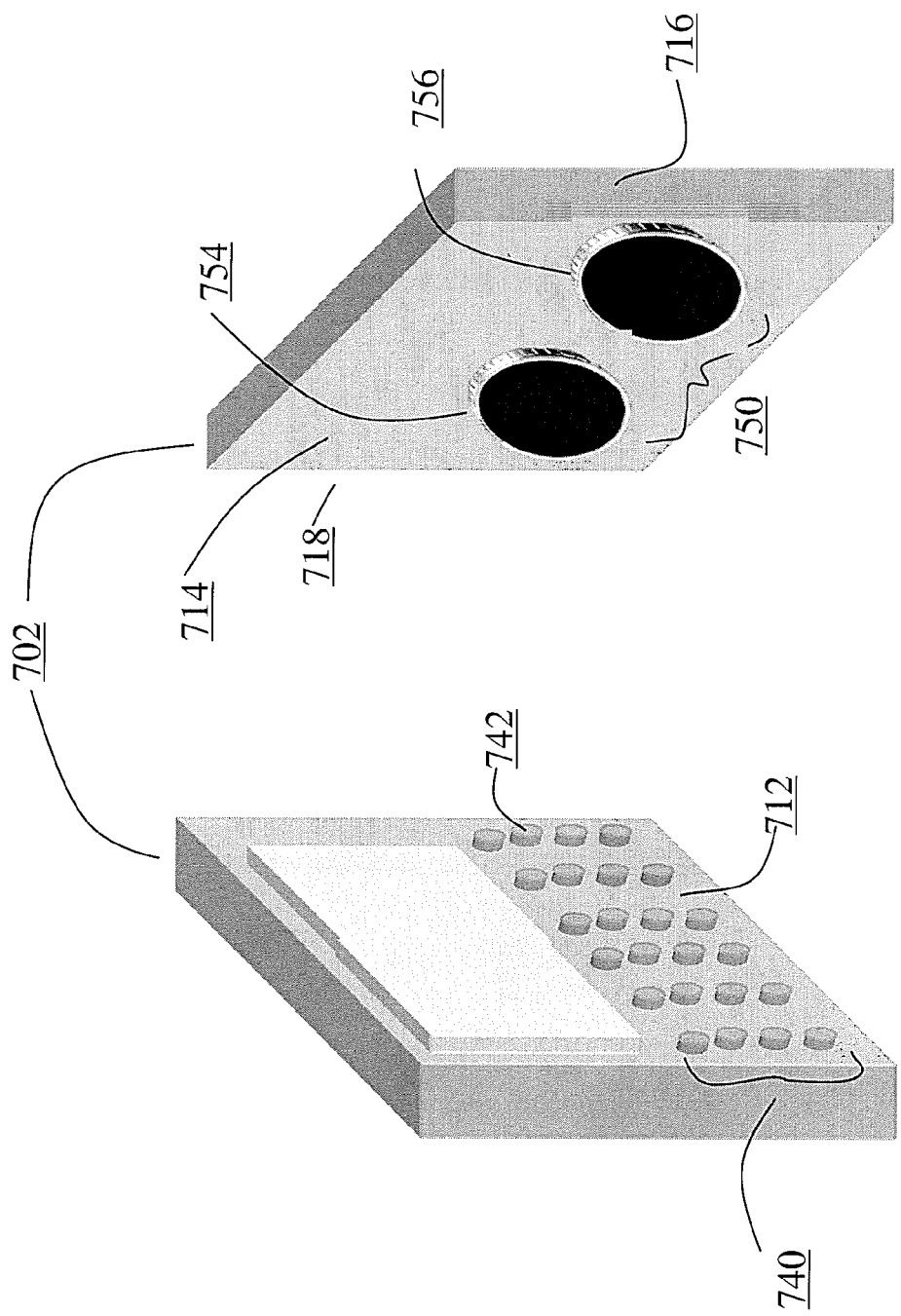
FIGS. 7a and 7b show a two-handed hand-held electronic device wherein the second input assembly includes two rotary dials.

FIGS. 7a and 7b illustrate front and back isometric views, respectively, of a two-handed hand-held electronic device 702. A first input assembly 740 including a plurality of input elements 742 is disposed on the front-side surface 712. A second input assembly 750, including two input or selection elements 754, 756, is disposed on the back-side surface 714. In this implementation, the two input elements 754, 756 are rotary dials. Alternatively, rotary dial 754 may be disposed on the left-side surface 716 and rotary dial 756 may be disposed on the right-side surface 718. In a one-handed hand-held electronic device, such as a cell-phone, typically one rotary dial is needed if placed on the back-side surface 714 or two rotary dials are needed if placed on the left and right side surfaces 716, 718. Rotation of the rotary dials 754, 756 may be mapped in software to represent one or more index positions. The rotary dials 754, 756 may be implemented with detents so that the user can distinguish between separate index positions, i.e., tactile feedback may be provided to the user's finger(s).

Figure 8:
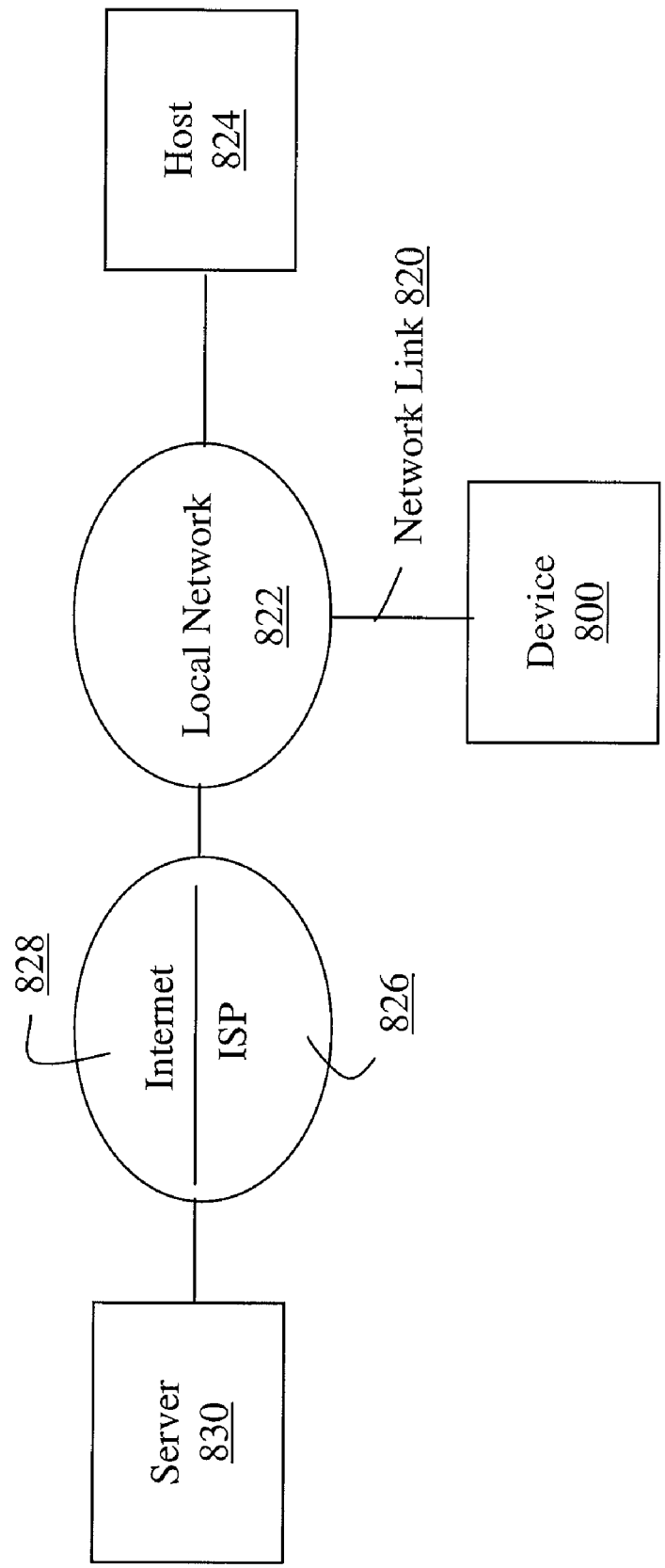
FIG. 8 is a block diagram of a hand-held electronic device in the context of a communication system that may be used to implement the human interface and input systems and techniques described here.

FIG. 8 is a block diagram that illustrates a hand-held electronic device 800, such as a cell-phone or PDA, upon which the human interface and input system and associated techniques described herein may be implemented in a communication system. Network link 820 typically provides data communication through one or more networks to other devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Network link 820 also could provide data communication directly to the ISP 826 and Internet 828. Local network 822 and Internet 828 both use electrical, electromagnetic or optical signals that carry digital data streams. The signals through the various networks and the signals on network link 820, which carry the digital data to and from electronic device 800, are exemplary forms of carrier waves transporting the information.

Electronic device 800 can send messages and receive data, including program code, which includes one or more sequences of one or more instructions, through the network(s) and network link 820. In the Internet example, a server 830 might transmit a requested code for an application program through Internet 828, ISP 826, local network 822 and network link 820. In one aspect, one such downloaded application may be for software games to be played on electronic device 800, which may obtain application code in the form of a carrier wave.

In any of the above implementations, active and/or passive tactile feedback may be implemented. To provide passive tactile feedback, the input elements of the first and/or second input assemblies may be combined with a palpable detent, such as a dome cap or dome spring so that a user can tactilely perceive, through his fingers or thumbs, activation and/or deactivation of an input element. In one implementation, among others, the palpable detent may be positioned between the actuator and sensor components of the input elements. To provide active tactile feedback, one or more vibratory units or force producing units may be mounted in the hand-held electronic device and activated to provide tap or index level or other information to a user. The vibratory unit may be an electric motor with an eccentric mass attached to the motor's shaft, a solenoid, a variable reluctance device, a loud speaker or any other vibrator that can provide tactile feedback. A force producing unit may be a solenoid in non-vibratory mode, a motor, non-vibratory actuators or any other actuator that can produce forces. A vibratory unit and/or force producing unit may be provided for each input element. In that case, the vibratory unit and/or force producing unit may be mounted below the input element so that when the vibratory unit and/or force producing unit is activated, the vibratory unit and/or force producing unit can push out the surface of the electronic device to a different level or position depending on the information to be communicated. Thus, in implementations using a pressure sensor pad or touch-pad as the input element, a stepped array may be configured to indicate higher and higher levels of index positions across the touch pad or pressure sensor pad. The vibratory units and/or force producing units may also be used to provide tactile feedback to indicate the momentary achievement of an objective, such as target lock in game applications. Tactile feedback may also be accomplished by actuators, such as a solenoid, which changes the stiffness of the input element electronically or pushes against the user's hand or fingers to indicate an event of interest in the software application.

The computational aspects described here can be implemented in analog or digital electronic circuitry, or in computer hardware, firmware, software, or in combinations of them. Where appropriate, aspects of these systems and techniques can be implemented in a computer program product tangibly embodied in a machine-readable storage device for execution by a programmable processor; and method steps can be performed by a programmable processor executing a program of instructions to perform functions by operating on input data and generating output.

The systems and techniques described above utilize the biomechanics of the thumb and fingers, i.e., it uses the function of opposition, the fine motor control of the fingers, and the larger range of motion and stronger actuation provided by the thumb. By using the fingers and thumb in concert, the number of taps and time needed to accomplish a given function is reduced, the accuracy is improved, and the natural programming inherent in the human hand replaces the training required for other systems.

A number of implementations have been described. Other implementations may include different or additional features. For example, other configurations of the one or more input elements of the first and second input assemblies may be realized. Also, the hand-held electronic devices described herein may have more or less than six planar or contoured surfaces. Moreover, the number of input elements in the first and second input assemblies are not limited to the number of input elements described in the implementations above.

Also, the one or more input elements of the first and second input assemblies may be any input or selection type known to one of skill in the art, such as keys, buttons, touch pads, other types of pads, rockers, sliders, dials, contact sensors or other actuators associated with any sensor. Each sensor associated with an actuator may include digital momentary on/off switches or analog sensors, such as pressure sensors (e.g., force sensitive resistors, piezo film sensors, or capacitive sensors), or positional sensors (e.g., rotary or linear potentiometers or encoders), or other analog sensors known to those of ordinary skill, or accelerometers or gyroscopes. The first and second input assemblies may include a combination of these different types of input or selection elements, which may be mounted in the configurations shown in the figures or imbedded within the device to permit control through motion of the overall device.

Moreover, the methods to provide data input, device control or game control may be performed in a different order and still achieve desirable results. Accordingly, other implementations are within the scope of the following claims.

What is claimed is:

1. A method for configuring a human interface and input system for use with a host hand-held electronic device configured to run applications, wherein at least one of the applications is associated with multiple input functions, the method comprising:
   selectively disposing on a first surface of the system a first input assembly having input elements configured to receive input from a human user through manipulation of the input elements, wherein at least one of the input elements of the first input assembly is further configured to map to one or more of the input functions associated with a selected one of the applications;
   selectively disposing on a second surface a second input assembly having one or more input elements configured to be manipulated by one or more of the human user's fingers, wherein at least one of the input elements of the second input assembly is further configured to selectively map to one or more of the input functions associated with the selected application; and
   selectively arranging the first input assembly and the second input assembly in substantial opposition to each other.

2. The method of claim 1 further comprising connecting a controller to the input elements of the first input assembly or the second input assembly to receive signals generated by a manipulation of one or more of the input elements-of first input assembly or the second input assembly.

3. The method of claim 1 further comprising:
   selectively disposing the second input assembly to include at least one sensor pad comprising a selectively configurable sensing surface that provides more than one delineated active area based on the selected application.

4. The method of claim 3 further comprising positioning a shape changing media relative to the sensor pad so as to permit the human user to tactilely discriminate between the plurality of delineated active areas.

5. The method of claim 3, further comprising selectively arranging the first delineated active area and the second delineated active area based on the user's hand.

6. The method of claim 3 further comprising positioning a palpable detent with at least one input element of the first input assembly or the second input assembly so as to provide tactile feedback when manipulated by the human user.

7. The method of claim 1, wherein selectively arranging the first and second input assemblies comprises selectively arranging the first and second input assemblies based on thumb-finger opposition arrangement of the human user's hand.

8. The method of claim 1, wherein the selected application is at least one of a scrolling application, a text application and a game application.

9. The method of claim 1, further comprising:
   physically or electronically labeling at least one input element of the first input assembly or the second input assembly so as to visually indicate an input function that can be selectively accessed by actuating the input element.

10. The method of claim 1, wherein selectively disposing the first and second input assemblies comprises selecting the first and second input assemblies to include input elements configured to be actuated by the human user's thumb and fingers arranged in substantial opposition.

11. The method of claim 1, further comprising including with the system at least one of a gyroscope or an accelerometer.

12. A method for configuring a human interface and input system for use with a host hand-held electronic device configured to run applications, wherein at least one of the applications is associated with multiple input functions, the method comprising:
   selectively disposing on a first surface a first input assembly having input elements configured to receive input from a human user's hand through manipulation of the plurality of input elements, wherein at least one of the input elements of the first input assembly is further configured to map to one or more of the input functions associated with a selected one of the of applications;
   selectively disposing on a second surface a second input assembly having one or more input elements configured to be manipulated by one or more of the human user's fingers, wherein at least one of the input elements of the second input assembly is further configured to selectively map to one or more input functions associated with the selected application; and
   selectively mapping the input functions of the selected application to the one or more input elements of the first input assembly and the second input assembly based on finger-thumb opposition arrangement of the human user's hand.

13. The method of claim 12 further comprising:
   selectively disposing the second input assembly to include at least one sensor pad comprising a selectively configurable sensing surface that provides more than one delineated active area based on the selected application.

14. The method of claim 13 further comprising positioning a shape changing media relative to the sensor pad so as to permit the human user to tactilely discriminate between the plurality of delineated active areas.

15. The method of claim 12, wherein the selected application is at least one of a scrolling application, a text application and a game application.

16. The method of claim 12 further comprising:
physically or electronically labeling at least one input element of the first input assembly or the second input assembly so as to visually indicate an input function that can be selectively accessed by actuating the input element.

17. The method of claim 12 further comprising:
connecting a controller to the input elements of the first input assembly or the second input assembly, wherein the controller is configured to receive signals generated by a manipulation of one or more of the input elements of first input assembly or the second input assembly.

18. The method of claim 12, wherein selectively disposing the first and second input assemblies comprises selecting the first and second input assemblies to include input elements configured to be actuated by the human user's thumb and fingers arranged in substantial opposition.

19. The method of claim 12, further comprising including with the system at least one of a gyroscope or an accelerometer.

20. The method of claim 1, wherein selectively arranging the first and second input assemblies comprises selectively arranging the first and second input assemblies based on thumb-finger opposition arrangement of the human user's hand.

* * * * *

UNITED STATES PATENT AND TRADEMARK OFFICE
CERTIFICATE OF CORRECTION

| | |
|---|---|
| PATENT NO. | : 7,667,692 B2 |
| APPLICATION NO. | : 12/329411 |
| DATED | : February 23, 2010 |
| INVENTOR(S) | : Beth Marcus and W. David Lee |

Page 1 of 1

It is certified that error appears in the above-identified patent and that said Letters Patent is hereby corrected as shown below:

IN THE CLAIMS:

Column 16, line 6 (Claim 6), delete "The method of claim 3" and insert --The method of claim 1--.

Signed and Sealed this

Twenty-fifth Day of May, 2010

David J. Kappos
*Director of the United States Patent and Trademark Office*